United States Patent [19]
Lenhart

[11] Patent Number: 5,478,174
[45] Date of Patent: Dec. 26, 1995

[54] CONTROLLED SPEED SINGLE FILE CONVEYOR

[75] Inventor: Ronald A. Lenhart, Lakewood, Colo.

[73] Assignee: Simplimatic Engineering Company, Lynchburg, Va.

[21] Appl. No.: 180,968

[22] Filed: Jan. 14, 1994

[51] Int. Cl.$^6$ ................................................ B65G 51/03
[52] U.S. Cl. ................................................................ 406/88
[58] Field of Search ........................... 406/86, 88; 226/7, 226/97

[56] References Cited

U.S. PATENT DOCUMENTS

| | | | |
|---|---|---|---|
| 3,475,058 | 10/1969 | Sanders | 406/88 |
| 3,734,567 | 5/1973 | Fong | 406/88 X |
| 3,759,579 | 9/1973 | Johnston | 406/88 |
| 4,462,720 | 7/1984 | Lenhart | 406/84 |
| 4,561,806 | 12/1985 | Lenhart | 406/88 |
| 4,744,702 | 5/1988 | Wiseman et al. | 406/88 |

*Primary Examiner*—David M. Mitchell
*Assistant Examiner*—Andrew C. Pike
*Attorney, Agent, or Firm*—Fields, Lewis, Rost & Smith

[57] ABSTRACT

A controlled speed single file conveyor conveys upright cylindrical articles in single file along a deck plate-from an upstream location to a downstream location. A plurality of rows of louvers extend through the deck plate which are generally parallel to one of the side edges. The louvers are at a very shallow angle and some of them are angled so that air discharged therethrough has a force vector component toward the inboard side edge and a force vector in the downstream direction. A vertical wall, above the deck plate and parallel to an inboard edge, is vertically adjustable above the upper surface of the deck plate to control the exhausting of air. The shallow angle of the louvers causes a portion of the air to flow along the deck and under the articles at sufficient speed to the articles toward the deck to hold them in upright position. A second portion of the air travels above the deck to create a mass air flow to move the articles along the deck in a downstream direction. A method includes supplying air through deck plate louvers wherein the air has a lateral force component and a downstream force component. A variable space between the deck plate and a wall is provided to allow air to be exhausted over the longitudinal edge of the deck plate to control the downstream speed of the articles. A low pressure area is created along the wall to hold the articles in single file.

16 Claims, 3 Drawing Sheets

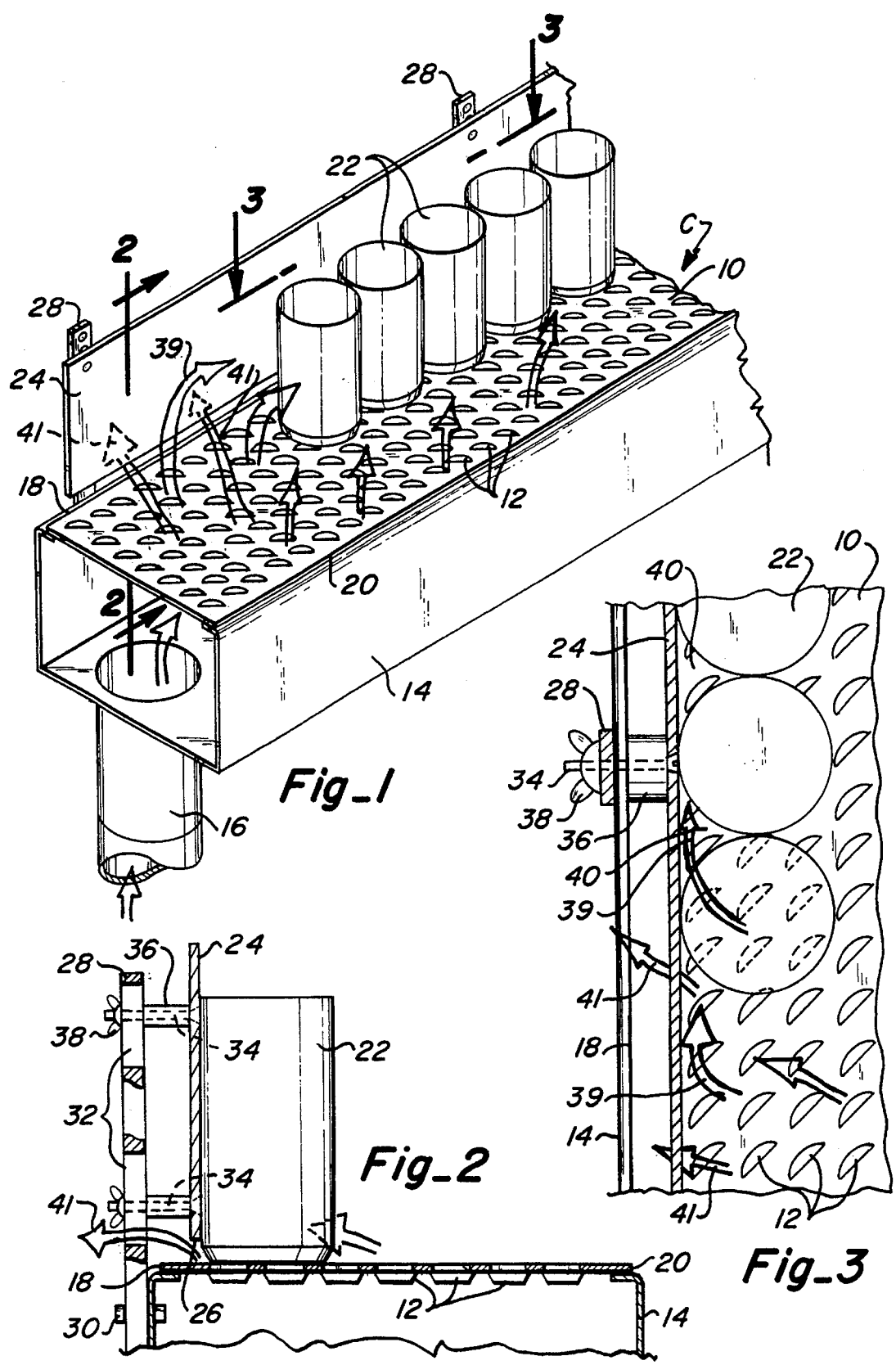

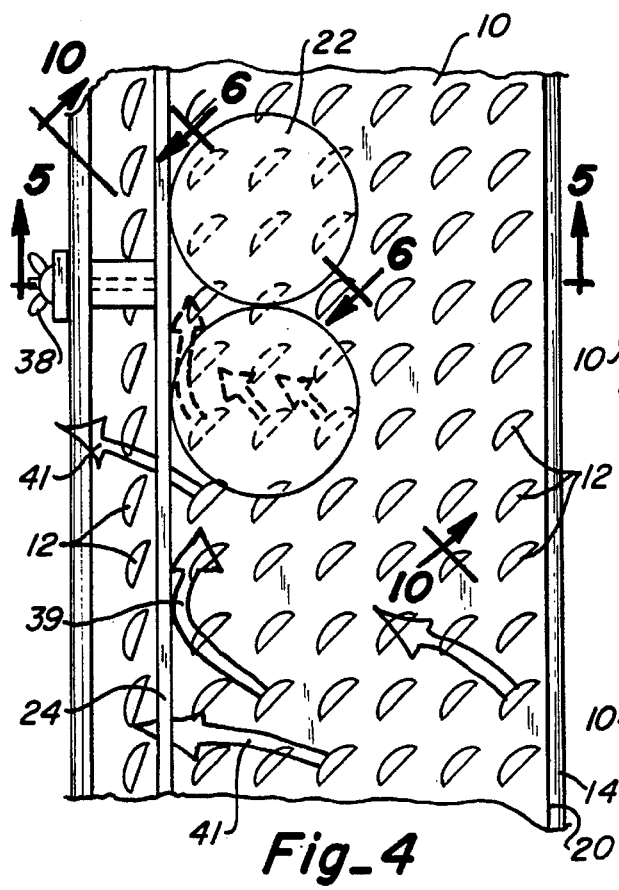

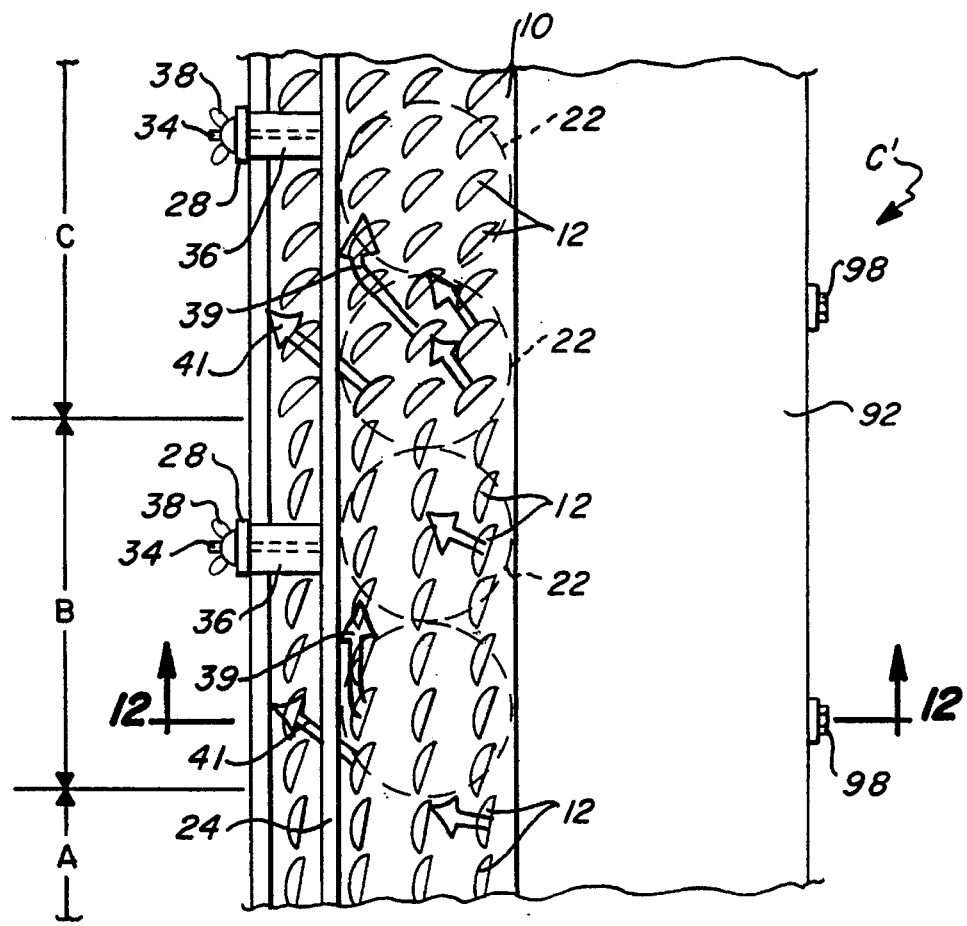
*Fig_11*
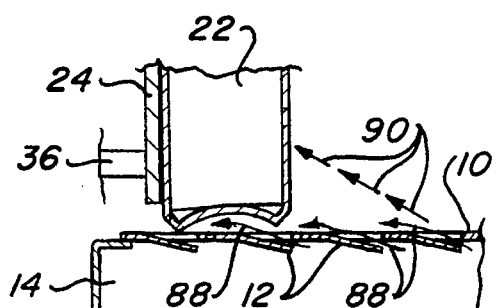
*Fig_10*
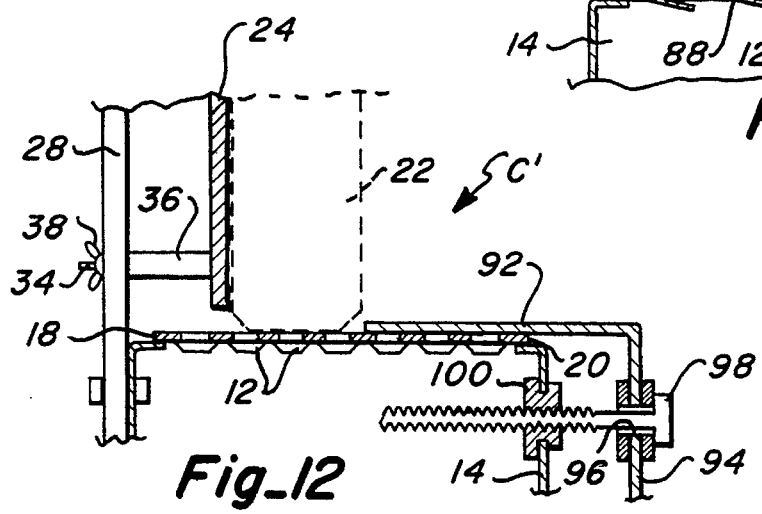
*Fig_12*

CONTROLLED SPEED SINGLE FILE CONVEYOR

TECHNICAL FIELD

This invention relates to a device for moving empty cylindrical articles, such as beverage containers, in single file. More particularly, the device relates to a single file conveyor in which the speed of movement of the containers along the conveyor can be controlled to minimize the possibility of damage and upsetting.

BACKGROUND ART

It is often necessary in a container manufacturing plant to convey containers from a mass into single file and to convey the single file containers at a desired predetermined speed. A problem associated with conventional air conveying equipment for conveying containers in single file is that the speed is not easily controlled and, in fact, the containers tend to reach extremely high speeds if uncontrolled, resulting in damage to the containers. Also, when the containers strike each other at high speed one or more of the containers may be upset causing the line of containers to jam. There is an ever increasing volume of air moving in the downstream direction from the upstream end of the conveyor to the downstream end. This causes the containers to tend to reach a terminal velocity, if not restrained, which may be substantially equal to the velocity of the air passing through the louvers or air jets supplying air to the conveying surface.

The mass of containers need to be fed into single file for supplying the containers to decorators, base coaters, and other apparatus in the plant which must perform an operation on or with respect to the container.

One such single filing apparatus is disclosed in my U.S. Pat. No. 4,462,720 for "Air Table System". This device supports containers on a table by a layer of air provided by air jets slanted in the downstream direction toward a single file conveying zone. An imperforate cover is placed above the surface of the table a distance slightly greater than the longitudinal dimension of the containers being transported and is positioned over at least a portion of the single file conveying zone. Blow-back jets are connected to a source of air under pressure for supplying air in the single file conveying zone in opposition to the direction of normal flow of the objects. By use of this apparatus, a mass of containers can be rearranged into single file arrangement for discharge at the downstream end of the table.

Another single filer is shown in my U.S. Pat. No. 4,561,806 for "Vertical Single Filer Conveyor System". In this apparatus, containers are fed from a mass of containers onto a table which has at least three zones extending from an upstream location. The containers are supported and moved by a prearranged pattern of flotation air jets. In addition, a row of acceleration jets, which are larger in size than the flotation jets, are located in the table adjacent to and spaced in parallel relation to converging sides of the table to form two converging rows of acceleration jets. Means is provided to incrementally increase the volume and velocity of air through the acceleration jets between each of the three zones from the upstream location to the downstream location to accelerate and longitudinally separate the objects as they move along the table from the upstream location to the downstream location so that the converging of the sides coacts with the acceleration jets to converge longitudinally separated containers in a prearranged pattern to bring them into single file. This device has been found to be very satisfactory for placing smooth decorated containers in single file at relatively high speed.

None of these devices provide for controlling the speed of the containers as they move in single file along the conveyor.

DISCLOSURE OF THE INVENTION

In accordance with this invention, a controlled speed single file conveyor is provided for conveying upright cylindrical articles, such as containers, from an upstream location to a downstream location. The single file conveyor has a deck plate extending from the upstream location to the downstream location. The deck plate has an inboard side edge and an outboard side edge and a plurality of rows of louvers extend generally parallel to one of the side edges. At least some of the louvers are angled so that air discharged through these louvers has a force vector component toward the one side edge and a force vector in the downstream direction. A plenum is connectable to a source of air pressure and is attached to the underside of the deck plate.

A vertical barrier or wall is positioned above the deck plate and adjacent to the inboard side edge. The wall has a lower edge positioned above the upper surface of the deck plate. This wall can be selectively raised and lowered to raise and lower the lower edge with respect to the deck plate to control the amount of air exhausted over the inboard edge of the deck. The rows of louvers are parallel to the edges of the deck plate. The louvers in each row are at an angle to the one side edge of the deck plate. This angle can be adjusted between 0° and 90° to control the downstream speed of the containers by controlling the downstream force component exerted by the air coming through the louvers versus the lateral force component exerted by the air. As used herein, 0° is the angle at which the air through the louvers is directed straight toward the wall and 90° is the angle in which the air through the louvers is in the downstream direction and parallel to the wall. The greater the angle, the greater the speed of the containers and vice versa. The greater the spacing of the lower edge of the wall above the deck plate, the more air that is exhausted over the inboard edge of the deck, and hence the slower the downstream speed of the containers and vice versa.

By the method of this invention, the air which is traveling downstream tends to flow along the wall because of the Coanda Effect. This flow of air creates a low pressure area between the containers and the wall because of Bernoulli's Principle so that the containers tend to be held against the wall and move along the deck plate in single file. Additionally, a low pressure area is created under each container which tends to hold them in upright position.

Also in accordance with the method of this invention, the angle of the louvers toward the inboard edge can be varied to vary the lateral force component and downstream force component of the air to control and vary the downstream speed of the container along the deck plate from the upstream location to the downstream location.

The method further includes varying the spacing between the bottom of the barrier and the deck plate to control the amount of air that is exhausted over the inboard edge of the deck plate to control the speed of the containers as they move from the upstream to the downstream location.

Finally, the method includes providing louvers at a very shallow angle to the surface of the deck plate to create a low pressure area under the bottom of each container, in accordance with Bernoulli's Principle, to assist in holding each of them in a substantially vertical upright position without tipping over. This single file conveyor will work with a wide variety of container constructions having different bottom constructions. It will work with aluminum containers and plastic bottles of all types, including those with petaloid bottoms.

The foregoing apparatus and method provide superior control over that which is possible with conventional apparatus and methods which include varying the air pressure in the plenum and varying the size of the louvers. With the foregoing method and apparatus, a single filer has been provided which can be operated to move containers of different sizes and construction in single file at controlled speeds to minimize damage to the containers and tipping of the containers.

Additional advantages of this invention will become apparent from the description which follows, taken in conjunction with the accompanying drawings.

BRIEF DESCRIPTION OF THE DRAWINGS

FIG. 1 is a perspective view of a single file conveyor constructed in accordance with this invention and showing the flow of air across the deck surface;

FIG. 2 is an enlarged vertical section, taken along line 2—2 of FIG. 1, showing the construction of the deck plate and the adjustment means for raising and lowering the wall to exhaust air under the wall;

FIG. 3 is an enlarged horizontal section, taken along line 3—3 of FIG. 1, showing the arrangement of the containers along the conveyor and the flow of air and the exhausting thereof between the wall and the deck plate;

FIG. 4 is a top plan view, similar to FIG. 3, but showing the wall moved inwardly beyond the first row of louvers and showing the exhausting of air under the wall;

FIG. 5 is a horizontal section, taken along line 5—5 of FIG. 4, showing the relationship of the vertical barrier and its adjustment means with respect to the deck plate;

FIGS. 6 through 9 are each an enlarged horizontal section, taken along line 6—6 of FIG. 4 showing the flow of air through the deck plate and past the bottom of each of four types of containers;

FIG. 10 is a fragmentary horizontal section, on a reduced scale, taken along line 10—10 of FIG. 4, showing further details of the flow of air through the louvers and how it impacts the containers;

FIG. 11 is a top plan view of a single file conveyor constructed in accordance with this invention which has an adjustable cover to control the active rows of louvers; and FIG. 12 is a horizontal section, taken along line 12—12, showing the adjustment means for the adjustable cover.

BEST MODE FOR CARRYING OUT THE INVENTION

In accordance with this invention, a single file conveyor C is provided which includes a deck plate 10 having an upper surface through which a plurality of rows of louvers 12 extend to communicate the upper surface with a bottom surface. A plenum 14 is connected to the bottom surface and is supplied with air under pressure, as through an inlet pipe 16. The deck plate has an inboard side edge 18 and an outboard side edge 20. The rows of louvers 12 are parallel with the side edges. Articles, such as containers 22, are supported and moved downstream by air which is discharged from plenum 14 through louvers 12.

Because of the angle of the louvers with respect to the side edges, the air pressure has a lateral component toward the first side edge 18 and a downstream component which moves the containers from an upstream location to a downstream location. The lateral component of air pressure moves the containers against a barrier or wall 24 which has a lower edge 26, as best seen in FIG. 2, which is spaced above the upper surface of deck 10. The air is directed laterally across the surface of deck plate 10 and passes through the space between lower edge 26 of wall 24 and deck plate 10 and is exhausted over the inboard side edge 18 of the deck plate. Conveniently, wall 24 is mounted on a plurality of spaced brackets, such as vertical brackets 28, each of which has a lower end attached to plenum 14, as by a fastener 30, and each has a plurality of vertical slots 32. The wall 24 is attached to brackets 28 by means of screws 34 which pass through spacers 36 mounted between wall 24 and brackets 28. The ends of the screws extend through slots 32 and are attached to wing nuts 38 for holding the wall in any desired vertical adjusted position.

The closer the bottom edge 26 of wall 24 is to deck plate 10, the less the amount of air that will be exhausted over the inboard side 18 of deck 10. Since this air is not exhausted, it is directed downstream by the wall 24, as illustrated by arrows 39, thereby exerting an additional downstream force component on the containers, causing them to move at a higher downstream speed. The containers are in contiguous side-by-side relationship, as best seen in FIG. 3. Since the lateral component of air which strikes the wall 24 is deflected in the downstream direction (see arrows 39), the air travels at a relatively high rate of speed along the surface of the barrier creating a low pressure area 40 in the space between the contiguous containers 22 and wall 24 so that the containers tend to be held against the wall 24 as they move from an upstream location to a downstream location. Bernoulli's Principle states that the higher the velocity of the air the lower the pressure. Also, the Coanda Effect is a wall attachment phenomenon which causes the air to travel along the surface of wall 24 so that low pressure areas 40 are created therealong to cause the containers to move into and stay in substantial contact with wall 24. By this means, the containers are held in single file. If it is desired to slow the containers down, the wall 24 can be raised so that the lower edge 26 is further above the top surface of deck plate 10 causing more air to be exhausted, as illustrated by arrows 41, and less air to move in the downstream direction.

In FIG. 5, the screws 34 and the spacers 36 have been replaced with longer screws 42 and correspondingly long spacers 44 so that wall 24 is spaced inwardly from inboard edge 18 of the deck plate a distance equal to the distance between one row of louvers 12. In this way, more air is exhausted under the wall, as shown by arrows 41, and over the inboard edge 18 of deck plate 10 resulting in less air traveling downstream. This also will cause the containers to travel at a slower rate of speed since less air is moving in a downstream direction along wall 24, as shown by arrows 39. The row of louvers outside of wall 24 create a low pressure area which drafts air under lower edge 26 of wall 24 from the other rows of louvers. If desired the wall can be positioned inboard more than one row of louvers.

FIGS. 6 through 9 disclose the flow of air under different types of containers. For example, in FIG. 6, a plastic bottle 46 is conveyed along deck plate 10 which has a concave bottom 48. Advantageously, louver 12 is at a very shallow angle with respect to the plane of the deck plate, the angle being on the order of 5° from horizontal. Thus, air exits plenum 14 through louvers 12, as shown by arrow 50, and then travels substantially parallel to the deck surface as shown by arrow 52. The air tends to travel along the deck surface because of the Coanda Effect, previously described. This rapidly moving air under bottom 48 of container 46 creates a low pressure under the container causing it to be pulled down and drawn toward the deck surface. This force is illustrated by dotted arrow 54. This downward force tends to hold the containers in an upright position even though they are very lightweight and have a high center of gravity. Because the louvers are at an angle to the downstream direction of the deck plate, as seen in FIG. 4, the containers tend to move toward the wall 24 and move downstream along the wall, as discussed above.

A second type of plastic container 56 is illustrated in FIG. 7 which has a shallow concave bottom 58 and, as with the embodiment of FIG. 6, the air from plenum 14 passes in the direction of arrow 60 through louver 12 and follows the path of arrow 62. Thus, the air travels along the deck and creates a low pressure area under bottom 58 of container 56, creating a downward pressure in the direction of dotted arrow 64.

A third type of plastic container is shown in FIG. 8 wherein a plastic bottle 66 is conveyed which has a petaloid bottom or base 68. This base 68 has a plurality of feet 70, each foot having a center recess or groove 72. These recesses 72 serve as passageways for air as explained below. Air travels from plenum 14 in the direction of arrow 74 through louver 12 and along the path of arrow 76 through the passageway of recess 72. As with the previously described containers, a low pressure area is formed between the deck surface and base 68 causing a downward force in the direction of dotted arrow 78 which tends to hold the containers in an upright position.

FIG. 9 shows a conventional aluminum container 22 which has a bottom 80 which is slightly concave. Air passes from plenum 14 in the direction of arrow 82 through louver 12 and travels adjacent the bottom along the direction of arrow 84. This movement of air creates a low pressure area between deck 10 and container bottom 80 resulting in a downward force as illustrated by dotted arrow 86.

It is clear from the description of FIGS. 6 through 9 that by blowing air from a plenum through louvers having a very shallow angle with respect to the surface of a deck plate, a reduced pressure can be provided under the bottom of the articles to hold them down against the deck plate so that the tendency for them to wobble and tip over is significantly reduced. The greater the static air pressure within the plenum, the higher the velocity of air passing through the louvers and the lower the air pressure under each article, thereby creating greater holding power against the deck. As illustrated, this principle is effective in handling articles of varying shapes and having different bases.

In many prior art devices for handling the plastic containers just described, they are normally conveyed by flanges on their necks which suspend them on a narrow track and air jets are used to move them along the track. This method is inefficient and the control of the articles is not very precise. In addition, because of the different height and diameter of the articles, the mechanism for suspending and conveying these articles must be capable of adjustment to a wide variety of sizes and shapes. This adds to the complexity and to the labor costs involved when changing the run of containers from one size to another. With the present invention, the only changes normally required to accommodate different containers are to adjust the height of the lower edge 26 of wall 24 above deck plate 10 and to adjust the static pressure in the plenum.

By way of example, a deck plate has been used in which the louvers are at an angle of 5° to the plane of the deck plate and have an open area of 0.0080 square inches. The lateral spacing between rows of louvers was 1.25" and the spacing between louvers in each row was 1.0". With the bottom of the wall or barrier spaced at 1.0" above the deck plate, two rows of operative louvers to the outboard side of the wall, and 17.0" of static pressure, twelve ounce aluminum beverage containers were conveyed without tipping over or experiencing any damage. This same structure worked satisfactorily with twenty-four-ounce aluminum beverage containers with a spacing between the bottom edge of the wall and the deck plate being 0.5". Various sizes and shapes of plastic containers were also conveyed. By way of example, a two-liter plastic beverage container with a petaloid base was conveyed using five active rows of louvers and a spacing between the bottom edge of the wall and the deck plate of 1.0".

The air which passes under the bottom of the containers as shown in FIGS. 6 through 9 is also illustrated in FIG. 10 by arrows 88, wherein the air, due to the Coanda Effect, stays adjacent to the surface of deck 10. However, some of the air passes along the path of arrows 90. This path is determined by the angle of the louvers and the further away the air travels from any given louver, the higher it rises above the deck plate. Thus, it ultimately will strike the side of a container 22 and tend to move the container in the direction in which the air above the surface of the deck is flowing. This air is used to control the movement of the containers along the deck surface. It will be apparent that the more outboard rows of louvers will have a greater effect on the forces exerted against the side of the containers than those louvers closest to the containers.

FIGS. 11 and 12 show a single file conveyor C' which has a multiple rows of louvers just like conveyor C. However, conveyor C' is provided with an adjustable louver cover 92 that extends over the outboard edge 20 of the conveyor and is adjustable to move it inboard or outboard to cover or expose additional rows of louvers. Any type of lateral adjustment means can be used. The louver cover is shown as having a depending flange 94 with spaced openings 96 through which spaced bolts 98 extend. The threaded end of bolts 98 are each received in a threaded member 100 which is mounted in the side wall of plenum 14.

The more rows of louvers that are exposed, the more air that is directed onto the side of the container from these outboard louvers, as illustrated in FIG. 10, thereby urging the containers to move in the direction of the flow of air. Conveniently, different portions of the conveyor may have the louvers at different angles. As shown in FIG. 11, an upstream portion A has louvers which are angled downstream at a very slight angle, such as 5° to 10°. In section B, the louvers are angled further downstream at a greater angle such as 20° to 30°. Finally, in section C, the louvers are angled downstream at a still greater angle, such as 45°. The greater the angle of the louvers in the downstream direction, the greater the force component of the air on the containers in the downstream direction and the faster the containers will move in that direction. It will be understood, that by varying the angle of the louvers the speed can be substantially controlled to increase it or decrease it, as desired. This provides an adjustment in addition to raising and lowering the bottom edge 26 of wall 24.

From the foregoing, the advantages of this invention are readily apparent. A simple yet efficient single file conveyor has been provided for moving containers therealong at a controlled speed. The control of the speed of the containers is accomplished in one or more ways. It can be done by changing the size of the louvers, by changing the angle of the louvers, by changing the static air pressure in the plenum, by changing the active number of rows of louvers, and by raising and lowering the side barrier or wall. By providing louvers which have a very shallow angle with respect to the deck surface, most of the air being discharged through the louvers will travel along the deck surface due to the Coanda Effect. The movement of air along the deck will create a low pressure area under the containers so that they are pulled toward the deck and held in a substantially upright position to minimize wobble and tipping. The mass air flow above the deck moves the containers along the deck. The speed of movement depends on the volume and direction of the mass air flow above the deck surface.

A method has been provided for bringing articles, such as beverage containers, into single file and for moving them along a side wall at a controlled speed. Also, a method is provided whereby a low pressure area is formed between the side wall and the contiguous adjacent containers so that they tend to move along this side wall. Finally, a method is provided for creating a low pressure area under the bottoms of the containers to cause them to be pulled toward the deck surface to minimize wobbling and tipping.

This invention has been described in detail with reference to particular embodiments thereof, but it will be understood that various other modifications can be effected within the spirit and scope of this invention.

I claim:

1. A controlled speed single file conveyor for conveying upright substantially cylindrical articles at a controlled speed from an upstream location to a downstream location, said single file conveyor comprising:

a deck plate extending from said upstream location to said downstream location, said deck plate having an upper surface, opposite inboard and outboard side edges spaced at a lateral distance, and an underside;

a plurality of rows of louvers, each having a width, communicating said upper surface and said underside, extending generally parallel to said side edges from said upstream location to said downstream location, at least some of said rows of louvers being angled so that air discharged through said angled rows of louvers has a force vector component toward said inboard side edge and a force component vector in a downstream direction;

a plenum connectable to a pressurized source of the air and is attached to said underside of said deck plate;

a vertical wall positioned above said deck plate adjacent and substantially parallel to said inboard side edge, said vertical wall having a lower edge positioned at a height above said upper surface; and means for adjusting said height of said lower edge of said wall above said deck plate to control the amount of the air from said rows of louvers being exhausted over said inboard edge by passing under said wall.

2. Apparatus, as claimed in claim 1, wherein:
    said angled rows of louvers are at a downstream angle to said wall which is greater than 0° and less than 90°.
3. Apparatus, as claimed in claim 1, wherein:
    said wall is positioned above said inboard edge.
4. Apparatus, as claimed in claim 1, wherein:

said wall is spaced inwardly from said inboard edge a distance equal to said width of at least one of said rows of said louvers.

5. Apparatus, as claimed in claim 1, wherein:
    said lateral distance across said deck plate is great enough that at least one of said rows of louvers is located between the articles and said outboard side edge when the articles are against said wall.
6. Apparatus, as claimed in claim 1, wherein:
    said lateral distance across said deck plate is great enough that more than one row of said plurality of rows of louvers are located between the articles and said outboard side edge when the articles are against said wall.
7. Apparatus, as claimed in claim 6, further including:
    a louver cover mounted for movement laterally across said deck plate to selectively block one or more rows of louvers located near the outboard side edge of said deck plate to control the speed of the articles along the deck surface; and adjustment means connected to said louver cover for selectively moving said louver cover inboard and outboard across said surface of said deck plate.

8. Apparatus, as claimed in claim 1, wherein said plurality of rows of louvers comprises:
    a first row of louvers adjacent said inboard side edge at a first angle to said inboard side edge; and at least a plurality of other rows of louvers at a second angle to said inboard side edge.

9. Apparatus, as claimed in claim 1, further including:
    a plurality of adjacent louver sections along said deck plate in the downstream direction, said adjacent louver sections having an angle in the downstream direction which is different in each said section to vary the speed of the articles as they move through each of said sections.

10. A method of conveying upright cylindrical articles in single file at a controlled downstream speed and in a downstream direction from an upstream location to a downstream location along a deck plate, having an inboard edge and an outboard edge and having a plurality of rows of louvers extending therethrough at an angle, and a wall, having a lower edge spaced from said deck plate, which serves as a barrier along the inboard edge of the deck plate, said method comprising the steps of:

supplying air under pressure through the louvers so that the air has a lateral force component and a downstream force component; and varying the space between the deck plate and the lower edge of the wall to allow the air from the louvers to pass under the wall and be exhausted over the inboard edge of the deck plate to control the amount of mass air moving in the downstream direction to control the downstream speed of the articles.

11. A method, as claimed in claim 10, including the further step of:
    creating a low pressure area between the articles and the wall so that the articles tend to be held against the wall so that the articles move along the deck plate in single file.
12. A method, as claimed in claim 10, including the further step of:
    varying the angle of the louvers toward the inboard edge to vary the lateral force component and the downstream force component of the air to control and vary the downstream speed of the articles along the deck plate from the upstream location to the downstream location.

13. A method, as claimed in claim 10, including the further step of:

provingdig a plurality of sections along the deck plate from an upstream position to a downstream position wherein the angle of the louvers in the downstream direction is different in each section to control the speed of the articles as they move along the deck plate from the upstream location to the downstream location.

14. A method of conveying upright substantially cylindrical articles in single file at a controlled speed in a downstream direction from an upstream location to a downstream location along a deck plate, having an inboard edge and an outboard edge and having a plurality of first rows of louvers therethrough, and a wall, having a lower edge, which serves as a barrier along the inboard edge of the deck plate, said method comprising the steps of:

supplying air under pressure through the first rows of louvers so that the air has a lateral force component and a downstream force component; and placing the first rows of louvers at an angle to the deck plate which is so shallow that a first portion of the air travels along the deck plate due to the Coanda Effect causing the air to flow under the articles at sufficient speed to create a low pressure area thereunder in accordance with Bernoulli's Principle so that the articles are pulled toward the deck plate and a second portion of the air travels above the deck plate to create a mass air flow to move the articles along the deck plate in the downstream direction.

15. A method as claimed in claim 14, including the additional steps of:

providing a second row of louvers between the articles and said outboard side edge when the articles are against the wall to provide a second portion of air above the deck plate to create the mass air flow.

16. A method as claimed in claim 14, including the additional steps of:

providing a plurality of third rows of louvers between the articles and said outboard side edge when the articles are against the wall to provide the second portion of air above the deck plate to create the mass air flow; and selectively blocking one or more of the third rows of louvers which are outboard of the articles.

* * * * *